(12) United States Patent
Iwatani et al.

(10) Patent No.: US 8,720,417 B1
(45) Date of Patent: May 13, 2014

(54) CONTROL SYSTEM OF INTERNAL COMBUSTION ENGINE

(71) Applicants: Kazuki Iwatani, Susono (JP); Yasushi Ito, Susono (JP); Shiro Tanno, Gotemba (JP)

(72) Inventors: Kazuki Iwatani, Susono (JP); Yasushi Ito, Susono (JP); Shiro Tanno, Gotemba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/874,911

(22) Filed: May 1, 2013

Related U.S. Application Data

(62) Division of application No. 12/765,488, filed on Apr. 22, 2010, now Pat. No. 8,534,237.

(51) Int. Cl.
*F02M 7/00* (2006.01)

(52) U.S. Cl.
USPC .......................................... 123/436; 701/111

(58) Field of Classification Search
USPC .......... 123/1 A, 305, 575, 436; 701/103, 110, 701/111
See application file for complete search history.

(56) References Cited

U.S. PATENT DOCUMENTS

| | | | |
|---|---|---|---|
| 4,478,177 A | 10/1984 | Valdespino | |
| 8,151,779 B1 | 4/2012 | Hagiwara et al. | |
| 8,166,926 B2 | 5/2012 | Sasaki et al. | |
| 8,206,470 B1 | 6/2012 | Jacobson | |
| 8,370,049 B1 * | 2/2013 | Shimizu et al. | 701/104 |
| 8,534,237 B2 * | 9/2013 | Iwatani et al. | 123/1 A |
| 2007/0209609 A1 | 9/2007 | Shimada et al. | |
| 2008/0223021 A1 | 9/2008 | Shaikh et al. | |
| 2010/0288211 A1 * | 11/2010 | Agosta | 123/3 |
| 2011/0259290 A1 * | 10/2011 | Michikawauchi et al. | 123/1 A |
| 2011/0265455 A1 * | 11/2011 | Hirota et al. | 60/285 |
| 2011/0283684 A1 * | 11/2011 | Aso et al. | 60/285 |
| 2011/0283959 A1 * | 11/2011 | Aso et al. | 123/3 |

FOREIGN PATENT DOCUMENTS

| | | |
|---|---|---|
| JP | A-55-104513 | 8/1980 |
| JP | A-02-157415 | 6/1990 |
| JP | A-03-194110 | 8/1991 |
| JP | A-5-332152 | 12/1993 |
| JP | A-2006-029147 | 2/2006 |
| JP | A-2007-239671 | 9/2007 |
| JP | A-2008-223763 | 9/2008 |
| JP | A-2009-097419 | 5/2009 |

\* cited by examiner

Primary Examiner — Thomas Moulis
(74) Attorney, Agent, or Firm — Oliff PLC

(57) ABSTRACT

An internal combustion engine can use ammonia and a non-ammonia fuel which is easier to burn than ammonia as fuel. The non-ammonia fuel is directly injected into a combustion chamber by a non-ammonia fuel injector, and the injected non-ammonia fuel is ignited, whereby combustion of the air-fuel mixture in the combustion chamber is commenced. In the control system of the internal combustion engine, the injection timing of the non-ammonia fuel is advanced at a time when a ratio of ammonia in all fuel fed to the internal combustion engine is high in comparison with the time when the ratio is low. Therefore, a control system of an internal combustion engine capable of using ammonia and a non-ammonia fuel (gasoline, light oil, hydrogen, etc.) which is easier to burn than ammonia, which suitably feeds fuel and controls combustion in order to suitably burn an air-fuel mixture in a combustion chamber is provided.

4 Claims, 8 Drawing Sheets

CONTROL SYSTEM OF INTERNAL COMBUSTION ENGINE

This is a Division of application Ser. No. 12/765,488 filed Apr. 22, 2010. The disclosure of the prior application is hereby incorporated by reference herein in its entirety.

BACKGROUND OF THE INVENTION

1. Field of the Invention

The present invention relates to a control system of an internal combustion engine.

2. Description of the Related Art

In an internal combustion engine, in the past, the fuel used has mainly been fossil fuels. However, in this case, burning such fuels produces $CO_2$, which causes global warming. On the other hand, burning ammonia does not produce $CO_2$ at all. Thus, there is known an internal combustion engine made so as to use ammonia as fuel and not produce $CO_2$ (for example, see Japanese Patent Publication (A) No. 5-332152).

However, ammonia is harder to burn compared with fossil fuels. Therefore, when using ammonia as fuel, some sort of measure is required for making the ammonia easier to burn. Thus, in the above-mentioned internal combustion engine, exhaust heat is utilized to reform the ammonia so as to produce reformed gas comprised of hydrogen and nitrogen, the hydrogen in the produced reformed gas is stored in a hydrogen storing alloy, and the hydrogen stored in the hydrogen storing alloy is fed together with the ammonia in a combustion chamber so as to enable easier combustion even when using ammonia as fuel.

As prior art, there is Japanese Patent Publication (A) No. 5-332152).

SUMMARY OF THE INVENTION

In this regard, to make the ammonia burn well, if feeding a fuel which is easier to burn than ammonia (for example, hydrogen, gasoline, diesel oil, etc., hereinafter referred to as a "non-ammonia fuel") into a combustion chamber in addition to ammonia, two different fuels will be fed into the combustion chamber. For this reason, in order to suitably burn an air-fuel mixture of these two fuels in the combustion chamber, it is necessary to suitably feed the fuel and control the combustion.

Therefore, the present invention has as its object to provide a control system of an internal combustion engine capable using ammonia and a non-ammonia fuel which is easier to burn than ammonia in which feed of fuels and control of combustion are suitably carried out in order to suitably burn the air-fuel mixture in the combustion chamber.

In order to achieve this object, in a first aspect of the invention, there is provided a control system of an internal combustion engine capable of using, as fuel, ammonia and a non-ammonia fuel which is easier to burn than ammonia, having the non-ammonia fuel directly injected into a combustion chamber by a non-ammonia fuel injection system, and having combustion of an air-fuel mixture in the combustion chamber commenced by ignition of the injected non-ammonia fuel, wherein an injection timing of the non-ammonia fuel is advanced at the time when a ratio of ammonia in all fuel fed to the internal combustion engine is high in comparison with the time when the ratio is low.

When the ratio of ammonia in all fuel fed to the internal combustion engine (hereinafter, referred to as an "ammonia feed ratio") becomes high, an ignitability of the entire fuel is lowered. On the other hand, when the injection timing of the non-ammonia fuel is advanced, the ignitability of the non-ammonia fuel becomes high. According to the first aspect of the invention, since the injection timing of the non-ammonia fuel is advanced at the time when the ammonia feed ratio is high in comparison with the time when the ratio is low, even when the ammonia feed ratio becomes high, the ignitability of the air-fuel mixture can be kept high.

In order to achieve the above object, in a second aspect of the invention, there is provided a control system of an internal combustion engine capable of using, as fuel, ammonia and a non-ammonia fuel which is easier to burn than ammonia and having combustion of the air-fuel mixture in the combustion chamber commenced by ignition of the air-fuel mixture by an ignition device, wherein the injection timing is advanced at the time when the ratio of ammonia in all fuel fed to the internal combustion engine is high in comparison with the time when the ratio is low.

When the ignition timing of the air-fuel mixture is advanced, the ignitability of the air-fuel mixture becomes high. According to the second aspect of the invention, since the ignition timing is advanced at the time when the ammonia feed ratio is high in comparison with the time when it is low, the ignitability of the air-fuel mixture can be kept high even when the ammonia feed ratio becomes high.

In order to achieve the above object, in a third aspect of the invention, there is provided a control system of an internal combustion engine capable of using, as fuel, ammonia and a non-ammonia fuel which is easier to burn than ammonia, having the non-ammonia fuel directly injected into a combustion chamber by a non-ammonia fuel injection system, and having an air-fuel mixture in the combustion chamber burnt by ignition of the injected non-ammonia fuel, wherein the injection of the non-ammonia fuel can be divided into a plurality of injections in one cycle and the number of injections is larger at the time when the ratio of ammonia in all fuel fed to the internal combustion engine is high in comparison with the time when the ratio is low.

If the number of injections of the non-ammonia fuel is made larger, the ignitability of the non-ammonia fuel becomes higher. According to the third aspect of the invention, since the number of injections of the non-ammonia fuel is made larger at the time when the ammonia feed ratio is high in comparison with the time when the ratio is low, the ignitability of the air-fuel mixture can be kept high even when the ammonia feed ratio becomes high.

In order to achieve the above object, in a fourth aspect of the invention, there is provided a control system of an internal combustion engine which is provided with an ammonia feeding system feeding ammonia and a non-ammonia fuel feeding system feeding non-ammonia fuel which is easier to burn than ammonia and which can run in a first running mode feeding only the non-ammonia fuel into a combustion chamber and a second running mode feeding both ammonia and non-ammonia fuel into the combustion chamber, which detects engine speeds or generated torques at the time of running in the first running mode and the time of running in the second running mode, calculates a difference among cylinders of engine speed or generated torque which may occur when feeding only ammonia into the combustion chamber based on the difference of engine speed or generated torque detected between the two running modes, and corrects an ammonia feed amount from the ammonia feeding system of each cylinder based on the calculated difference among cylinders of engine speed or generated torque.

According to the fourth aspect of the invention, since the difference among cylinders of engine speed or generated torque which may occur when feeding only ammonia into the combustion chamber can be calculated, even when there is a variation in the ammonia feed amount from the ammonia feeding system, that variation can be compensated for based on this difference among cylinders.

In a fifth aspect of the invention, there is provided the fourth aspect of the invention where when the ammonia feed amount is a reference feed amount or more, the system corrects downward an ammonia feed amount of a cylinder in which the engine speed or generated torque which may occur when feeding only ammonia into a combustion chamber is smaller than in the other cylinders and, when the ammonia feed amount is smaller than the reference feed amount, the system corrects upward an ammonia feed amount of a cylinder in which the engine speed or generated torque which may occur when feeding only ammonia into a combustion chamber is smaller than in the other cylinders.

In a sixth aspect of the invention, there is provided the fifth aspect of the invention wherein when downward correction of the ammonia feed amount does not result in the difference of engine speed or generated torque which may occur when feeding only ammonia into a combustion chamber between the downward corrected cylinder and other cylinders becoming smaller, the system corrects upward the ammonia feed amount and when upward correction of the ammonia feed amount does not result in the difference of engine speed or generated torque which may occur when feeding only ammonia into a combustion chamber between the upward corrected cylinder and the other cylinders becoming small, the system corrects downward the ammonia feed amount.

In a seventh aspect of the invention, there is provided the sixth aspect of the invention wherein the system stops the feed of ammonia when the difference of engine speed or generated torque which may occur when feeding only ammonia into a combustion chamber between the upward or downward corrected cylinder and the other cylinders does not become small even when correcting the ammonia feed amount upward or correcting it downward.

Summarizing the advantageous effects of the invention, according to the present invention, in an internal combustion engine capable of being fed ammonia and a non-ammonia fuel which is easier to burn than ammonia, there is provided a control system able to suitably feed fuel and control combustion so that the air-fuel mixture in the combustion chamber is suitably burnt.

BRIEF DESCRIPTION OF THE DRAWINGS

There and other objects and features of the present invention will become clearer from the following description of the preferred embodiments given with reference to the attached drawings, wherein.

DESCRIPTION OF THE PREFERRED EMBODIMENTS

Figure 1:
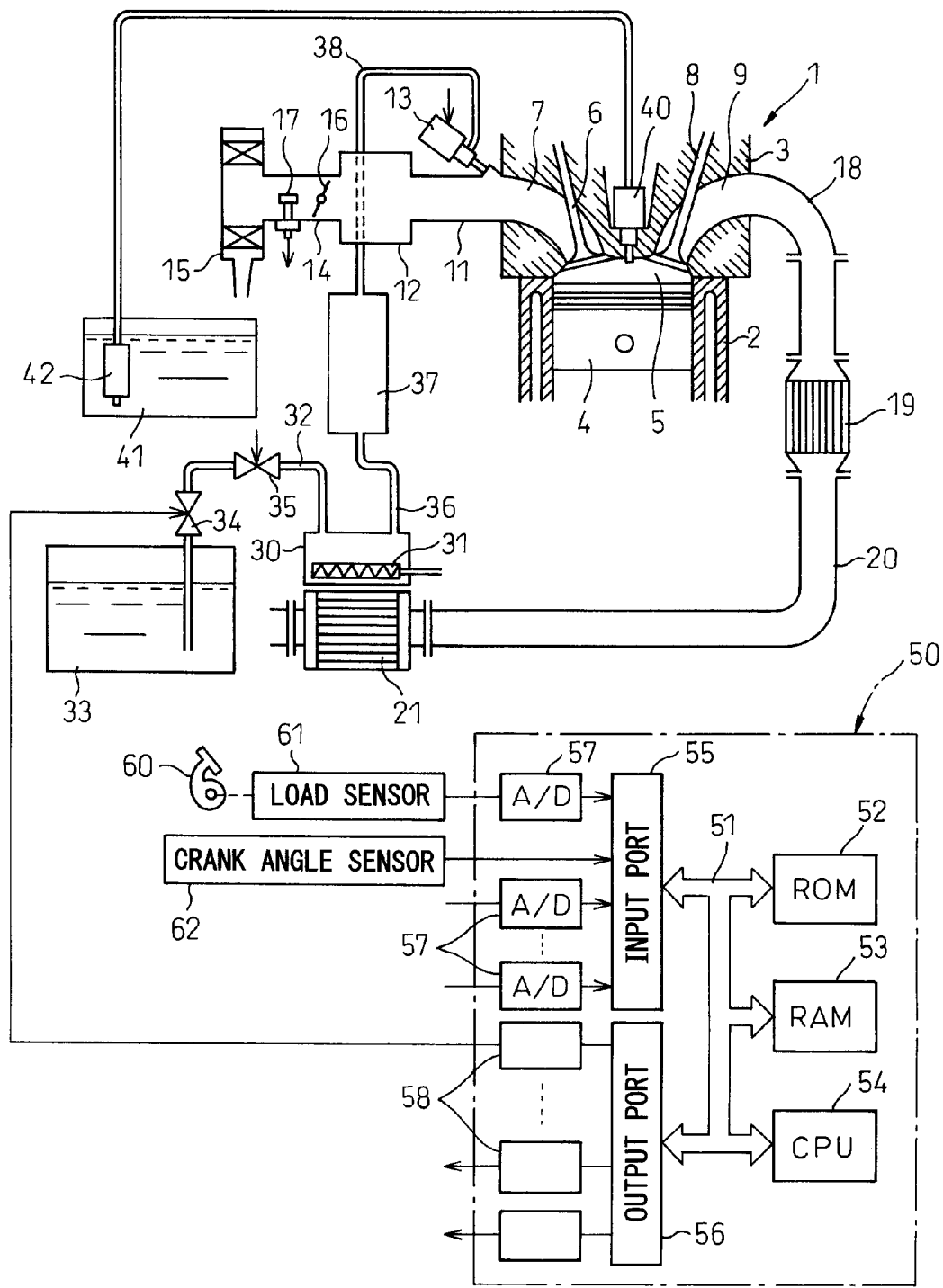
FIG. 1 is an overall view of a compression ignition type internal combustion engine.

An embodiment of the present invention will be explained in detail below with reference to the drawings. Note that, in the following explanation, similar components are assigned the same reference numerals.

FIG. 1 is an overall view of a compression ignition type internal combustion engine in which a control system of the present invention is used. Referring to FIG. 1, 1 indicates an internal combustion engine body, 2 a cylinder block, 3 a cylinder head, 4 a piston, 5 a combustion chamber, 6 an intake valve, 7 an intake port, 8 an exhaust valve, and 9 an exhaust port. In the internal combustion engine shown in FIG. 1, use is made of ammonia as a first fuel and a non-ammonia fuel as a second fuel which is easier to burn than ammonia. These two types of fuels are fed into the combustion chamber 5.

As this non-ammonia fuel, use can be made of a fuel easier to burn than ammonia, for example, gasoline, diesel oil, liquefied natural gas, or hydrogen obtained by reforming ammonia. FIG. 1 shows a case where use is made of a fuel which self ignites, for example, diesel oil, among these non-ammonia fuels.

Referring to FIG. 1, each intake port 7 is connected to a surge tank 12 through intake branch pipes 11. In each intake branch pipe 11, an ammonia injector 13 for injecting gaseous ammonia toward the interior of the corresponding intake port 7 is arranged. The surge tank 12 is connected to an air cleaner 15 through an intake duct 14. In the intake duct 14, a throttle valve 16 driven by an actuator and an intake air detector 17 using for example a hot wire are arranged. On the other hand, the exhaust port 9 is connected to an upstream side exhaust purification system 19 through an exhaust manifold 18. In the embodiment shown in FIG. 1, this upstream side exhaust purification system 19 may be an ammonia adsorbent able to adsorb ammonia in the exhaust gas or an $NO_x$ adsorbent able to adsorb $NO_x$ in the exhaust gas, etc. The upstream side exhaust purification system 19 is connected to a downstream side exhaust purification system 21 through an exhaust pipe 20. In the embodiment shown in FIG. 1, this downstream side exhaust purification system 21 may be an oxidation catalyst, $NO_x$ storage reduction catalyst, $NO_x$ selective reduction catalyst, etc.

Further, a vaporizer 30 for vaporizing liquid ammonia is arranged adjacent to the downstream side exhaust purification system 21. In this vaporizer 30, a heater 31 is arranged so that the liquid ammonia can be vaporized even when the temperature of the exhaust gas is low. The vaporizer 30 is connected to a fuel tank 33 through an ammonia inflow pipe 32. In this ammonia inflow pipe 32, a shut-off valve 34 which is open at the time of running of the engine, but is closed when the engine stops, and pressure regulator 35, are arranged. The interior of the fuel tank 33 is filled with about 0.8 MPa to 1.0 MPa of a high pressure liquid ammonia. The liquid ammonia in the fuel tank 33 is fed into the vaporizer 30 through the ammonia inflow pipe 32. In the embodiment shown in FIG. 1, the vaporizer 30 is formed so as to be heated by the exhaust gas, and accordingly the liquid ammonia fed into the vaporizer 30 is vaporized in the vaporizer 30.

The gaseous ammonia vaporized in the vaporizer 30 is fed into an ammonia gas tank 37 through an ammonia flow out pipe 36. The gaseous ammonia in the ammonia gas tank 37 is fed to the ammonia injector 13 through a gaseous ammonia feed pipe 38, and the gaseous ammonia is injected from the ammonia injector 13 toward the interior of the corresponding intake port 7.

Note that, in the present embodiment, the liquid ammonia is heated by the exhaust gas by using the vaporizer 30. However, the liquid ammonia may be heated and vaporized by another method as well, for example, using only a heater. Further, in the present embodiment, gaseous ammonia is injected from the ammonia injector 13. However, the liquid ammonia may be directly injected from the ammonia injector 13 as well. In this case, the liquid ammonia in the fuel tank 33 is fed to the ammonia injector 13 without going through the vaporizer 30.

On the other hand, as shown in FIG. 1, at the center of a top surface of the combustion chamber 5, a non-ammonia fuel injector 40 for directly injecting the non-ammonia fuel into the combustion chamber 5 is arranged. To this fuel injector 40, the non-ammonia fuel in a fuel tank 41 is fed by a feed pump 42. As explained before, in the embodiment shown in FIG. 1, a self igniting fuel is used as the non-ammonia fuel.

As shown in FIG. 1, an electronic control unit 50 is comprised of a digital computer provided with a ROM (read only memory) 52, RAM (random access memory) 53, CPU (microprocessor) 54, input port 55, and output port 56 all connected to each other by a bi-directional bus 51. An output signal of the intake air detector 17 is input through a corresponding AD converter 57 to the input port 55. An accelerator pedal 60 is connected to a load sensor 61 generating an output voltage proportional to the amount of depression of the accelerator pedal 60. The output voltage of the load sensor 61 is input through a corresponding AD converter 57 to the input port 55. Further, the input port 55 is connected to a crank angle sensor 62 generating an output pulse each time the crankshaft rotates by for example 10°.

On the other hand, the output port 56 is connected through the corresponding drive circuits 58 to the ammonia injector 13, a driving actuator of the throttle valve 16, shut-off valve 34, pressure regulator 35, non-ammonia fuel injector 40, and feed pump 42.

In this regard, as explained above, ammonia is hard to burn in comparison with fossil fuels. For this reason, in the present embodiment, non-ammonia fuel which is easier to burn than ammonia is fed to the combustion chamber 5 in addition to ammonia so that combustion easily occurs even when ammonia is used. Due to this, at the time of combustion of the air-fuel mixture (air-fuel mixture of ammonia, non-ammonia fuel, and air), the non-ammonia fuel is self ignited first. Namely, by self ignition of the non-ammonia fuel injected from the non-ammonia fuel injector 40, combustion of the air-fuel mixture in the combustion chamber 5 is commenced. After that, by spread of the flame up to ammonia, the ammonia begins to be burned. Accordingly, in order to cause combustion of the air-fuel mixture in the combustion chamber 5 well, it is necessary to cause good self ignition of the non-ammonia fuel directly injected into the combustion chamber 5.

However, when the ratio of ammonia in all fuel fed into the combustion chamber 5 (hereinafter, referred to as the "ammonia feed ratio") becomes large, the ignitability of the non-ammonia fuel, that is, the ignitability of the air-fuel mixture, is lowered.

Namely, when the ammonia feed ratio increases, that is, when the feed amount of the gaseous ammonia increases, the feed amount of air relatively decreases. Here, ammonia has a high ignition temperature and slow combustion speed and therefore does not contribute much to the self ignition of the air-fuel mixture. For this reason, when the feed amount of the gaseous ammonia which almost does not contribute to the self ignition of the air-fuel mixture increases and the feed amount of air decreases, the ignitability of the non-ammonia fuel will be lowered.

Figure 2:
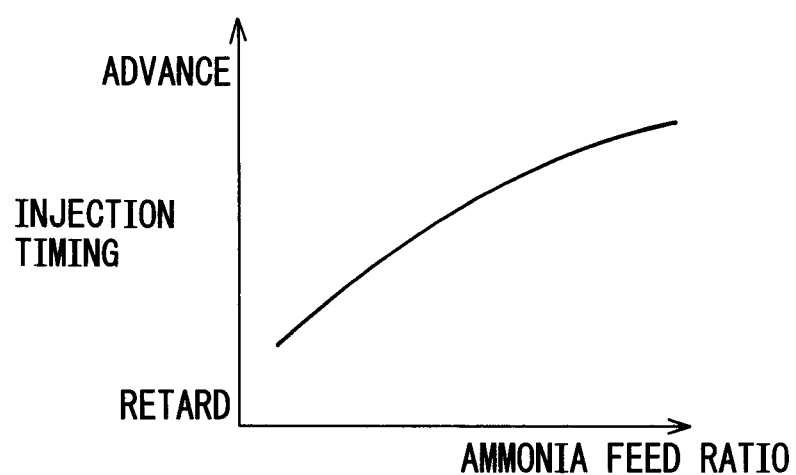
FIG. 2 is a view showing a relationship between an ammonia feed ratio and an injection timing of a non-ammonia fuel.

Therefore, in the embodiment of the present invention, the injection timing of the non-ammonia fuel is changed in accordance with the ammonia feed ratio. FIG. 2 is a view showing the relationship between the ammonia feed ratio and the injection timing of the non-ammonia fuel in a certain engine running state (that is, certain engine speed, engine load, etc.) As seen from FIG. 2, in the present embodiment, the injection timing of the non-ammonia fuel is advanced at the time when the ammonia feed ratio is high in comparison with the time when the ratio is low. In particular, in the present embodiment, the injection timing of the non-ammonia fuel is advanced as the ammonia feed ratio becomes higher.

Here, when the injection timing of the non-ammonia fuel is advanced, a long mixing time of the non-ammonia fuel injected from the non-ammonia fuel injector 40 with the air can be secured. Further, the injection timing of the non-ammonia fuel from the non-ammonia fuel injector 40 can be made to approach the top dead center of compression more. As a result, the non-ammonia fuel can be injected at the time when the temperature of the air-fuel mixture in the combustion chamber 5 is high. This situation is shown in FIG. 3.

Figure 3:
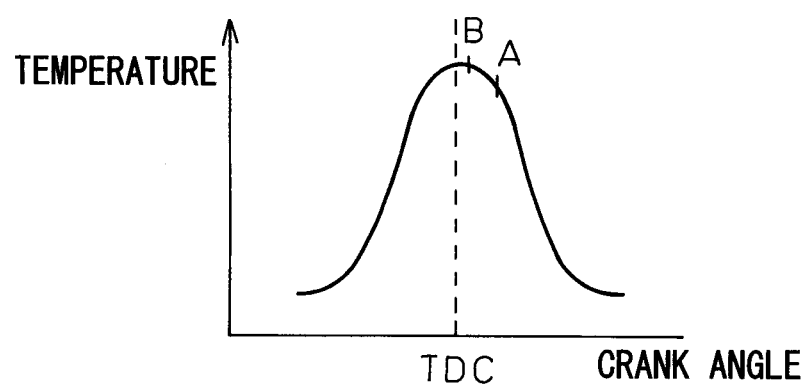
FIG. 3 is a view showing the relationship between a crank angle and a temperature of an air-fuel mixture in a combustion chamber.

FIG. 3 is a view showing a transition of temperature of the air-fuel mixture in the combustion chamber 5 in accordance with a crank angle at the time of cranking. As seen from FIG. 3, at the time of cranking, that is, at the time when there is no combustion of the air-fuel mixture in the combustion chamber 5, the temperature of the air-fuel mixture in the combustion chamber 5 rises along with an upward movement of the piston 4, becomes the maximum at the top dead center of compression, and then falls along with the downward movement of the piston. In general, the injection of the non-ammonia fuel into the combustion chamber 5 is carried out at a timing later than the top dead center of compression to a certain extent (timing A in FIG. 3). For this reason, the temperature in the combustion chamber 5 at the timing A is lower than the temperature in the combustion chamber 5 at the top dead center of compression.

On the other hand, at a timing B on the advanced side from the timing A, the temperature in the combustion chamber 5 is higher than that at the timing A. For this reason, when the injection timing of the non-ammonia fuel is advanced from the timing A to the timing B in FIG. 3, the temperature in the combustion chamber 5 at the injection timing of the non-ammonia fuel becomes high.

In this way, when the injection timing of the non-ammonia fuel is advanced, in addition to a long mixing time of non-ammonia fuel and air able to be secured, the injection of the non-ammonia fuel can be carried out at a timing when the temperature of the air-fuel mixture in the combustion chamber 5 is high. As a result, the ignitability of the non-ammonia fuel can be raised. Accordingly, according to the present embodiment, even when the ammonia feed ratio increases, the ignitability of the non-ammonia fuel, that is, the ignitability of the air-fuel mixture, can be kept high by advancing the injection timing of the non-ammonia fuel.

Note that, the injection timing of the non-ammonia fuel is changed in accordance with the engine load and engine speed, etc., as well. Accordingly, a map as shown in FIG. 2 may be prepared in advance for each engine load and engine speed, and the injection timing of the non-ammonia fuel may be determined by this map based on the engine load, engine speed, and ammonia feed ratio. Alternatively, a map of an injection timing correction amount in accordance with the ammonia feed ratio may be prepared in advance, and the final injection timing may be determined by adding the injection timing correction amount to the injection timing of the non-ammonia fuel which is calculated based on the engine load and engine speed.

Further, in the above embodiment, the injection timing of the non-ammonia fuel is adjusted in accordance with the ammonia feed ratio. However, the injection timing of the non-ammonia fuel may be adjusted in accordance with the ammonia feed amount as well. In this case, the injection timing of the non-ammonia fuel is retarded as the ammonia feed amount becomes larger.

Further, in the above embodiment, a case where the present invention is applied to a compression ignition type internal combustion engine using a fuel which self ignites, for example, diesel oil, as the non-ammonia fuel is shown. However, it is also possible to apply the present invention to a spark ignition type internal combustion engine using a fuel which starts to be burned by sparking by an ignition device, for example, gasoline or hydrogen, as the non-ammonia fuel. Below, an explanation will be given with reference to FIG. 4 taking as an example a case where gasoline is used as the non-ammonia fuel.

Figure 4:
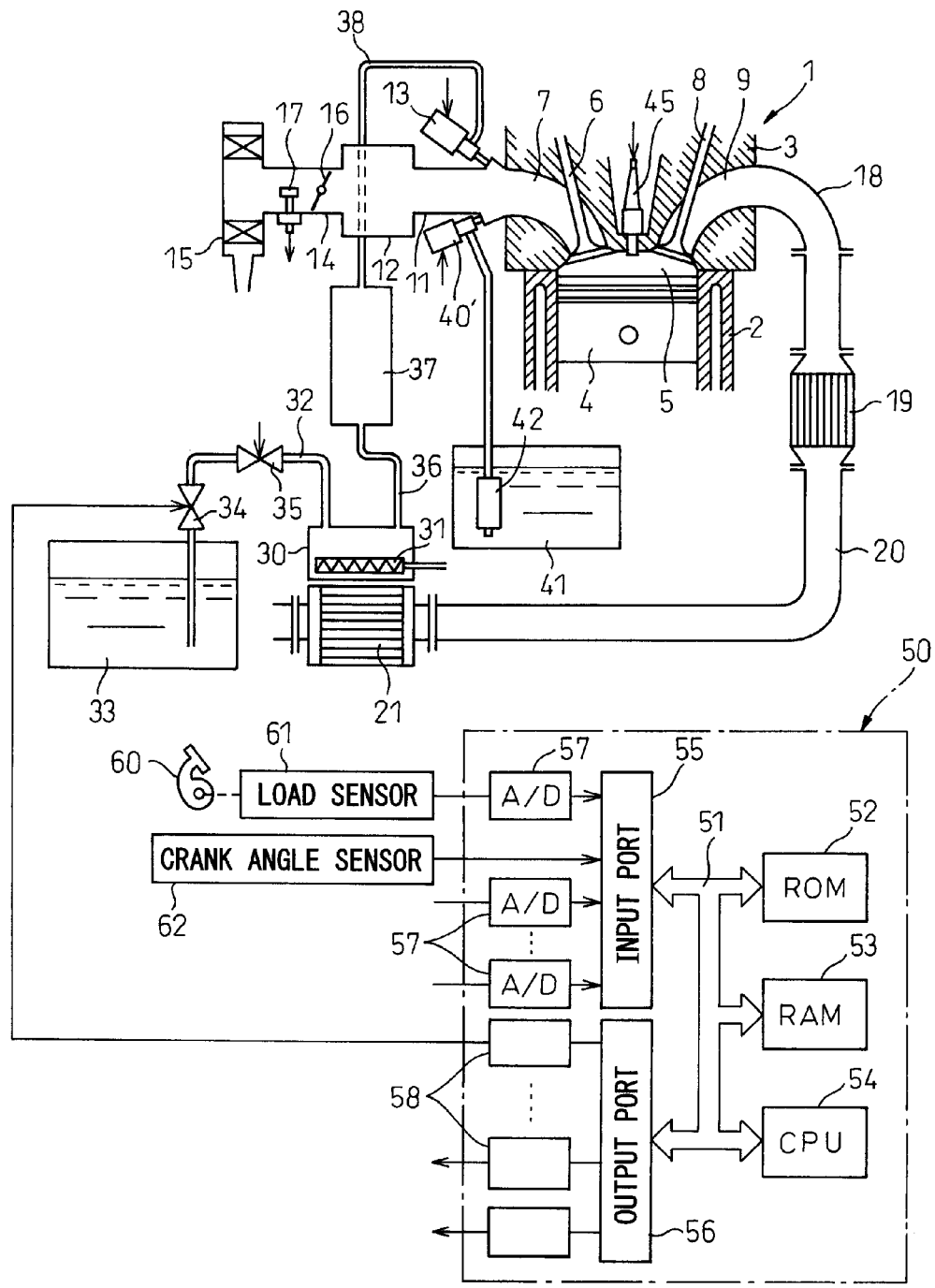
FIG. 4 is an overall view of a spark ignition type internal combustion engine.

FIG. 4 is an overall view of a spark ignition type internal combustion engine to which a control system of the present invention is applied. In the internal combustion engine shown in FIG. 4, a non-ammonia fuel injector 40' is arranged in each intake branch pipe 11, and the non-ammonia fuel can be injected toward the interior of each corresponding intake port 7 (note that, it may be configured so that the non-ammonia fuel injector 40' is arranged on the top surface of the combustion chamber 5 and the non-ammonia fuel is injected toward the interior of each corresponding combustion chamber 5 as well). Further, as shown in FIG. 4, an ignition device 45 is arranged at the center of the top surface of the combustion chamber 5.

At the time of combustion of the air-fuel mixture in the internal combustion engine configured in this way, first, the ignition device 45 ignites the non-ammonia fuel in the combustion chamber 5. Namely, the combustion of the air-fuel mixture in the combustion chamber 5 is commenced by the ignition of the air-fuel mixture by the ignition device 45. After that, combustion of the ammonia begins by spread of the flame up to the ammonia.

Here, in the case of the compression ignition type internal combustion engine explained above, the injection timing of the non-ammonia fuel was changed in accordance with the ammonia feed ratio. Contrary to this, in the case of a spark ignition type internal combustion engine, the ignition timing by the ignition device 45 is changed in accordance with the ammonia feed ratio. Specifically, the ignition timing by the ignition device 45 is advanced at the time when the ammonia feed ratio is high in comparison with the time when the ratio is low, particularly, the ignition timing by the ignition device 45 is advanced more as the ammonia feed ratio becomes higher.

By advancing the ignition timing by the ignition device 45 as the ammonia feed ratio becomes higher in this way, in the same way as that the ignition timing was advanced as explained above, even when the ammonia feed ratio increases, the ignitability of the non-ammonia fuel, that is, the ignitability of the air-fuel mixture, can be kept high.

Figure 5A:
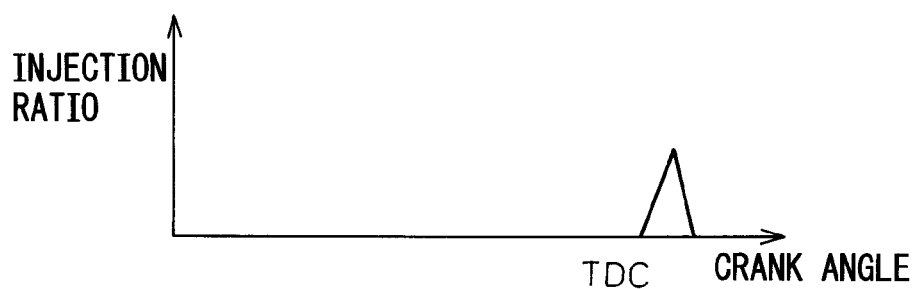
FIGS. 5A and 5B are views showing a fuel injection mode from a non-ammonia fuel injector.
Figure 5B:

In this regard, in a compression ignition type internal combustion engine, the number of injections of the non-ammonia fuel from the non-ammonia fuel injector 40 in one cycle can be changed. For example, in the example shown in FIG. 5A, in the vicinity of the top dead center of compression, only one injection of the non-ammonia fuel is carried out. However, in contrast, in the example shown in FIG. 5B, two injections of the non-ammonia fuel are carried out in the vicinity of the top dead center of compression.

By increasing the number of injections of the non-ammonia fuel from the non-ammonia fuel injector 40 in this way, the number of ignition points of the air-fuel mixture in the combustion chamber 5 can be increased. Further, by the second or third injection in a state where the combustion has been already commenced in the combustion chamber 5, fluidizing of the air-fuel mixture in the combustion chamber 5 during combustion can be promoted. For this reason, by increasing the number of injections of the non-ammonia fuel from the non-ammonia fuel injector 40, the combustion of the air-fuel mixture in the combustion chamber 5 is promoted.

Figure 6:
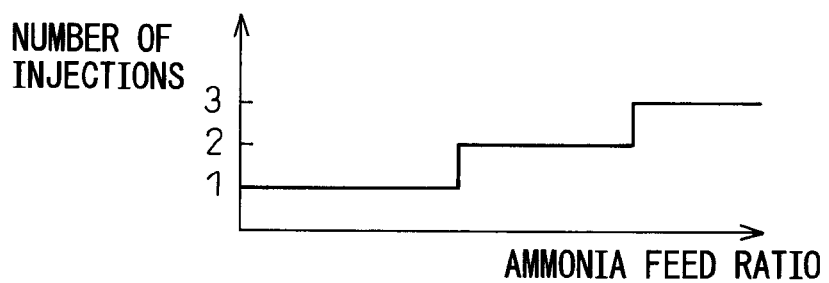
FIG. 6 is a view showing the relationship between an ammonia feed ratio and a number of injections.

Therefore, in the embodiment of the present invention, the number of injections of the non-ammonia fuel from the non-ammonia fuel injector 40 is increased in accordance with the ammonia feed ratio. FIG. 6 is a view showing the relationship between the ammonia feed ratio and the number of injections of the non-ammonia fuel from the non-ammonia fuel injector 40 in a certain engine running state (that is, certain engine speed, engine load, etc.) As seen from FIG. 6, in the present embodiment, when the ammonia feed ratio is high, the number of injections of the non-ammonia fuel is made larger in comparison with the time when the ratio is low. In particular, in the present embodiment, the number of injections of the non-ammonia fuel is increased as the ammonia feed ratio becomes higher.

As explained above, when the ammonia feed ratio increases, the feed amount of air into the combustion chamber 5 decreases and air concentration in the air-fuel mixture is lowered. As a result, the ignitability of the non-ammonia fuel is lowered. Contrary to this, in the present embodiment, when the ammonia feed ratio increases, the number of injections of the non-ammonia fuel from the non-ammonia fuel injector 40 is increased, and combustion of the air-fuel mixture in the combustion chamber 5 is promoted. Accordingly, according to the present embodiment, even when the ammonia feed ratio increases, by increasing the number of injections of the non-ammonia fuel from the non-ammonia fuel injector 40, the ignitability of the non-ammonia fuel, that is, the ignitability of the air-fuel mixture can be kept high.

Note that, the number of injections of the non-ammonia fuel is changed in accordance with the engine load and engine speed, etc., as well. Accordingly, a map as shown in FIG. 6 may be prepared in advance for each engine load and engine speed, and the number of injections of the non-ammonia fuel may be determined in this map based on the engine load, engine speed, and ammonia feed ratio. Alternatively, a map of the correction amount of the number of injections in accordance with the ammonia feed ratio may be prepared in advance, and the correction amount of the number of injections may be added to the number of injections of the non-ammonia fuel calculated based on the engine load and engine speed to determine the final number of injections.

In this regard, there are individual differences in fuel injectors such as the ammonia injector 13 and non-ammonia fuel injector 40. Further, the degree of deterioration due to aging, etc., differs for each fuel injector. Therefore there is sometimes variation among cylinders in the fuel injection amount from the fuel injector.

Here, when only one type of fuel injector is provided, that is, when only non-ammonia fuel injectors are provided, variation among cylinders in the fuel injection amount can be detected by detecting the transition of engine speed or torque, etc., in one cycle.

However, when two fuel injectors of the ammonia injector 13 and non-ammonia fuel injector 40 are provided, if fuels are injected from both fuel injectors 13 and 40, even if the transition of the engine speed or torque, etc., in one cycle is detected, it cannot be determined if there is any variation among cylinders of the fuel injection amount in the ammonia injector 13, if there is any variation among cylinders of the fuel injection amount in the non-ammonia fuel injector 40, or if there is any variation among cylinders of the fuel injection amount in the two.

However, even in a case where two types of fuel injectors are provided, so far as the fuel is injected from only one type of fuel injector, variation among cylinders of the fuel injection amount can be detected for that type of fuel injector. For example, if fuel is not injected from the ammonia injector 13, but fuel is only injected from the non-ammonia fuel injector 40, variation among cylinders of the fuel injection amount in the non-ammonia fuel injector 40 can be detected based on the transition of engine speed or torque, etc., in one cycle.

In this regard, as explained above, ammonia is hard to burn. Therefore, in the present embodiment, ammonia is never solely fed into the combustion chamber 5, but is always fed together with the non-ammonia fuel. Namely, in the present embodiment, fuel is never injected from only the ammonia injector 13 without injecting fuel from the non-ammonia fuel injector 40. For this reason, variation among cylinders of the fuel injection amount in the ammonia injector 13 cannot be detected by injecting fuel from only the ammonia injector 13.

Therefore, in this embodiment of the present invention, the engine speed or torque at the time of running in the running mode feeding only the non-ammonia fuel into the combustion chamber 5 (hereinafter, referred to as a "first running mode") is detected, the engine speed or torque at the time of running in the running mode feeding both of ammonia and non-ammonia fuel into the combustion chamber 5 (hereinafter, referred to as a "second running mode"}) is detected, a difference among cylinders of engine speed or torque which may occur when feeding only ammonia into the combustion chamber 5 is calculated based on the detected difference among cylinders of engine speed or torque between the two running modes, and variation among cylinders of the ammonia feed amount from the ammonia injector 13 is calculated based on the calculated difference among cylinders of engine speed or torque.

In the following description, an explanation will be given by taking as an example a case where the difference among cylinders of engine speed which may occur when feeding only ammonia into the combustion chamber 5 is calculated based on the engine speed detected at the time of running in each running mode. Note that, in the following explanation, the engine speed which changes according to combustion in the combustion chamber 5 of a certain cylinder, that is, the engine speed from the top dead center of compression of a certain cylinder up to the top dead center of compression of the next cylinder, will be referred to as the engine speed of the certain cylinder.

Figure 7A:
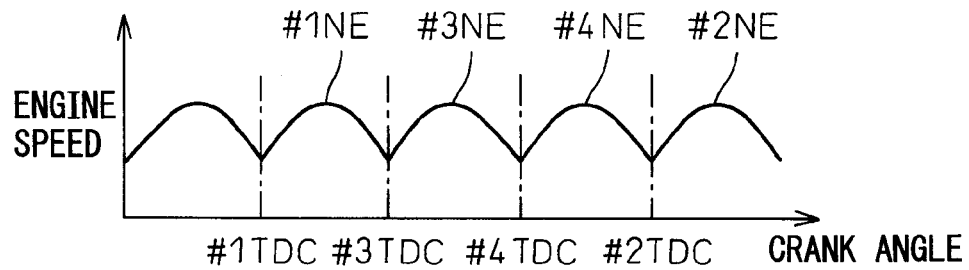
FIGS. 7A to 7C are views showing a trend in instantaneous engine speed in accordance with the crank angle.
Figure 7B:
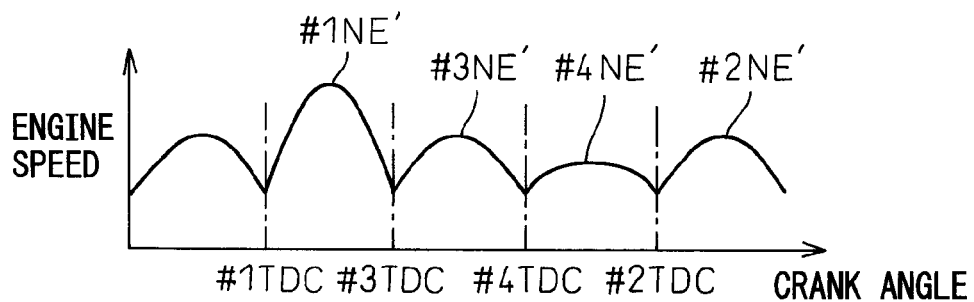
Figure 7C:
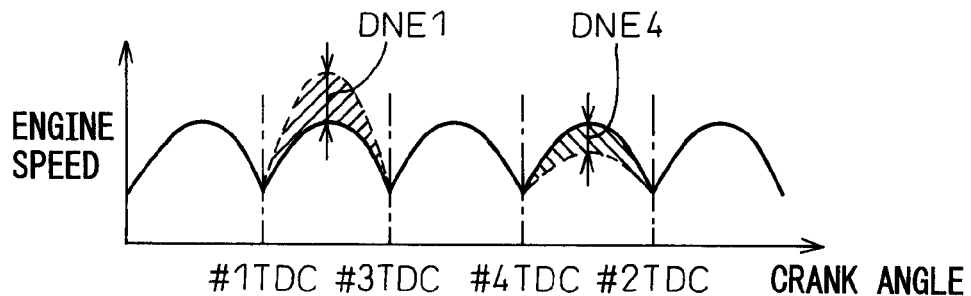

FIGS. 7A to 7C are views showing a transition of instantaneous engine speed in accordance with a crank angle in one cycle in four-cylinder internal combustion engine. FIG. 7A shows a transition of instantaneous engine speed in a case of running in the first running mode, that is, a case where fuel is not injected from the ammonia injector 13, but the fuel is injected from only the non-ammonia fuel injector 40. In the illustrated example, there is no variation among cylinders in instantaneous engine speed and accordingly there is no variation among cylinders in the fuel feed amount from the non-ammonia fuel injector 40.

On the other hand, FIG. 7B shows a transition of instantaneous engine speed in a case of running in the second running mode, that is, a case where fuel is injected from the two fuel injectors of the ammonia injector 13 and non-ammonia fuel injector 40. In the illustrated example, an instantaneous engine speed during a period from when the first cylinder reaches the top dead center of compression to when the third cylinder reaches the top dead center of compression is higher than the engine speeds during periods other than that. On the other hand, an instantaneous engine speed during a period from when the fourth cylinder reaches the top dead center of compression to when the second cylinder reaches the top dead center of compression is lower than the engine speeds during periods other than that.

The difference between the engine speed when fuel is injected from the two fuel injectors of the ammonia injector 13 and non-ammonia fuel injector 40 and the engine speed when the fuel is injected from only the non-ammonia fuel injector 40 which is detected in this way is shown in FIG. 7C by hatching. This difference indicated by the hatching in FIG. 7C represents the result of subtracting the influence of variation among cylinders of the fuel injection amount of the non-ammonia fuel injector 40 from the variation among cylinders of the fuel injection amount of the two fuel injectors of the ammonia injector 13 and non-ammonia fuel injector 40, that is, variation among cylinders of the fuel injection amount of the ammonia injector 13. In other words, the difference indicated by hatching in FIG. 7C represents the difference among cylinders of the engine speed occurring when feeding only ammonia into the combustion chamber 5. In the example shown in FIGS. 7A to 7C, due to variation among cylinders of the ammonia injection amount, the engine speed becomes high in the first cylinder, but the engine speed becomes low in the fourth cylinder.

Accordingly, in the present embodiment, the engine speed when the fuel is injected from only the non-ammonia fuel injector 40 is subtracted from the engine speed when the fuel is injected from the two fuel injectors of the ammonia injector 13 and non-ammonia fuel injector 40, and the difference among cylinders of the fuel feed amount (ammonia feed amount) from the ammonia injector 13 is calculated based on the difference found by this subtraction. Due to this, the difference among cylinders of the fuel injection amount from the ammonia injector 13 can be correctly calculated.

More specifically, in the present embodiment, as the engine speed, use is made of a peak speed occurring by combustion in each cylinder. Namely, in the present embodiment, the difference (DNE1, DNE3, DNE4, DNE2) between the peak speed (that is, #1NE, #3NE, #4NE, #2NE in FIG. 7A) occurring by combustion in each cylinder in a case of running in the first running mode, that is, a case where the fuel is injected from only the non-ammonia fuel injector 40, and the peak speed (that is, #1NE', #3NE', #4NE', #2NE' in FIG. 7B) occurring by combustion in each cylinder in a case of running in the second running mode, that is, a case where the fuel is injected from the two fuel injectors 13 and 40 is calculated for each cylinder (DNE1=#1NE'−#1NE, DNE3=#3NE'−#3NE, DNE4=#4NE'−#4NE, DNE2=#2NE'−#2NE). The differences calculated in this way (DNE1, DNE3, DNE4, DNE2)

represent differences among cylinders of peak speed occurring when feeding only ammonia into the combustion chamber 5 and accordingly represent differences among cylinders of generated torque when feeding only ammonia into the combustion chamber 5.

Note that, in the embodiment described above, at the time of calculation of the difference among cylinders of the fuel injection amount, use is made of the peak speed. However, it is also possible to use other parameters so far as these are parameters representing torques occurring by combustion in cylinders. As such parameters, there can be mentioned, for example, a torque itself generated by combustion in each cylinder, a value obtained by square of a difference between a peak speed occurring by combustion in each cylinder and the engine speed before the former by 90°, a pressure in the combustion chamber 5, and so on.

Further, detection of engine speed, etc., in the first running mode and detection of engine speed, etc., in the second running mode are carried out at the timing when the engine speed or generated torque is the same. For example, the detection of engine speeds, etc., in the two running modes is carried out during idling. Further, ammonia is hard to burn. Therefore, running according to the first running mode is carried out at the time of cold start of the engine, while running in the second running mode is carried out after warmup of the engine. Accordingly, detection of the engine speed, etc., in the first running mode is carried out at the time of cold start of the engine and another time, then detection of engine speed, etc., in the second running mode is carried out after warmup of the engine. Note that, it is also possible to prevent switching from the first running mode to the second running mode in a case where the detection of the engine speed, etc., in the first running mode is not completed even when the cold start of engine is completed.

After calculating the variation among cylinders of generated torque occurring due to variation among cylinders of the ammonia injection amount from the ammonia injector 13 in this way, the fuel injection amount is corrected based on the calculated variation among cylinders.

In this regard, the engine speed (or torque) changes among cylinders according to variation of the ammonia injection amount from the ammonia injector 13 as explained above, but this change of engine speed is not always proportional to the fuel injection amount.

For example, in a region where the ammonia injection amount is large, a large amount of ammonia is injected. Therefore, even when the ammonia injection amount is slightly smaller than the target ammonia injection amount, the generated torque does not much decrease. On the other hand, since ammonia is used as fuel, in this region, even if the ammonia injection amount is slightly larger than the target ammonia injection amount, the torque is greatly lowered due to degradation of combustion of the air-fuel mixture. Accordingly, in the region where the ammonia injection amount is large, in a cylinder having a lower engine speed (or torque) than the other cylinders, the possibility of lowering of the torque due to degradation of combustion occurring since the ammonia injection amount is larger than the other cylinders is high.

On the other hand, in the region where the ammonia injection amount is small, the amount of the injected fuel is small, therefore the generated torque greatly decreases even if the ammonia injection amount is slightly smaller than the target ammonia injection amount. Namely, in the region where the ammonia injection amount is small, a cylinder having a lower engine speed (or torque) than the other cylinders has a high possibility of lowering of the torque due to a smaller amount of ammonia injection than that in the other cylinders rather than the lowering of the torque due to degradation of combustion.

Therefore, in the embodiment of the present invention, in the region where the ammonia injection amount is larger than a reference injection amount, the ammonia injection amount is corrected downward for a cylinder having a lower engine speed than in the other cylinders, and in the region where the ammonia injection amount is smaller than the reference injection amount, the ammonia injection amount is corrected upward for a cylinder having a lower engine speed than in the other cylinders. Due to this, the difference among cylinders of the ammonia injection amount from the ammonia injector 13 can be suitably compensated for.

In this regard, as explained above, in a cylinder having a lower engine speed (or torque) than in the other cylinders, in the region where the ammonia injection amount is large, the possibility of lowering of torque due to the degradation of combustion occurring since the ammonia injection amount is larger than in the other cylinders is high. In the region where the ammonia injection amount is small, the possibility of lowering of torque due to a smaller amount of the ammonia injection than in the other cylinders is high. However, even in the region where the ammonia injection amount is large, there also exists a case where lowering of torque occurs since the ammonia injection amount is smaller than in the other cylinders. In this case, when the fuel injection amount is corrected downward for a cylinder having a lower engine speed than in the other cylinders, the difference of torque from the other cylinders is made increasingly larger. Conversely, there also exists a case where lowering of torque occurs due to the degradation of combustion in the region where the fuel injection amount is small. In this case, when the fuel injection amount is corrected upward for the cylinder having a lower engine speed than in the other cylinders, the difference of torque from the other cylinders is made increasingly larger.

Therefore, in the embodiment of the present invention, after the upward correction or downward correction of the ammonia injection amount, the engine speed which may occur when feeding only ammonia into the combustion chamber 5 is detected again. As a result of detecting the engine speed in this way, if the difference of the engine speed of the cylinder in which lowering of engine speed has occurred before the upward correction or downward correction of the ammonia injection amount from the speeds of the other cylinders does not become smaller even when the upward correction or downward correction of the ammonia injection amount is executed, the ammonia injection amount is corrected reversing the increase and decrease.

Namely, in a case where downward correction of the ammonia injection amount does not result in the difference between the downward corrected cylinder and the other cylinders of the engine speed which may occur when feeding only ammonia into the combustion chamber 5 becoming smaller, the ammonia injection amount is corrected upward. Conversely, in a case where upward correction of the ammonia injection amount does not result in the difference between the upward corrected cylinder and the other cylinders of the engine speed which may occur when feeding only ammonia into the combustion chamber 5 becoming smaller, the ammonia injection amount is corrected downward.

Namely, when the difference between the generated torque of a cylinder and the generated torque of the other cylinders is not decreased irrespective of upward correction of the ammonia injection amount, the ammonia injection amount is corrected downward. Conversely, when the difference between the generated torque of a cylinder and the generated torque of the other cylinders is not decreased irrespective of downward correction of the ammonia injection amount, the ammonia injection amount is corrected upward. Due to this, variation among cylinders of the ammonia injection amount from the ammonia injector 13 can be reliably compensated for.

Note that, in a case where the difference between the generated torque of a cylinder and the generated torque of the other cylinders is not decreased even in a case where either of the upward correction or downward correction of the ammonia injection amount is carried out, it is determined that the ammonia injection system is abnormal, the fuel injection from the ammonia injector 13 is suspended, and fuel injection from only the non-ammonia fuel injector 40 is carried out.

Further, in the embodiment described above, the case of compensating for variation among cylinders of the ammonia injection amount from the ammonia injector 13 in a compression ignition type internal combustion engine was shown. However, variation among cylinders of the ammonia injection amount can be compensated for in the same way in a spark ignition type internal combustion engine.

Figure 8:
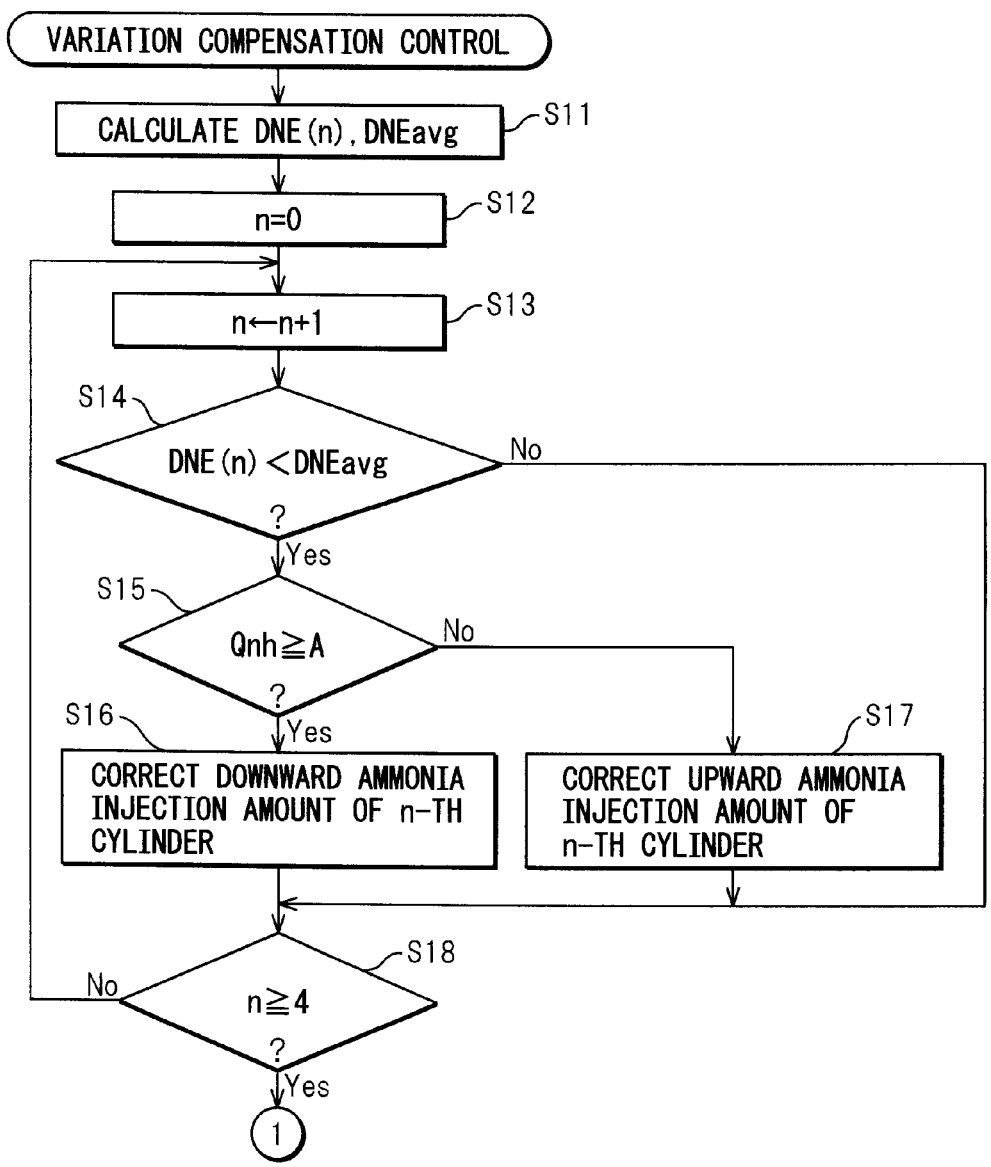
FIG. 8 is a portion of a flowchart showing a control routine of variation compensation control compensating for variation among cylinders of the ammonia injection amount.
Figure 9:
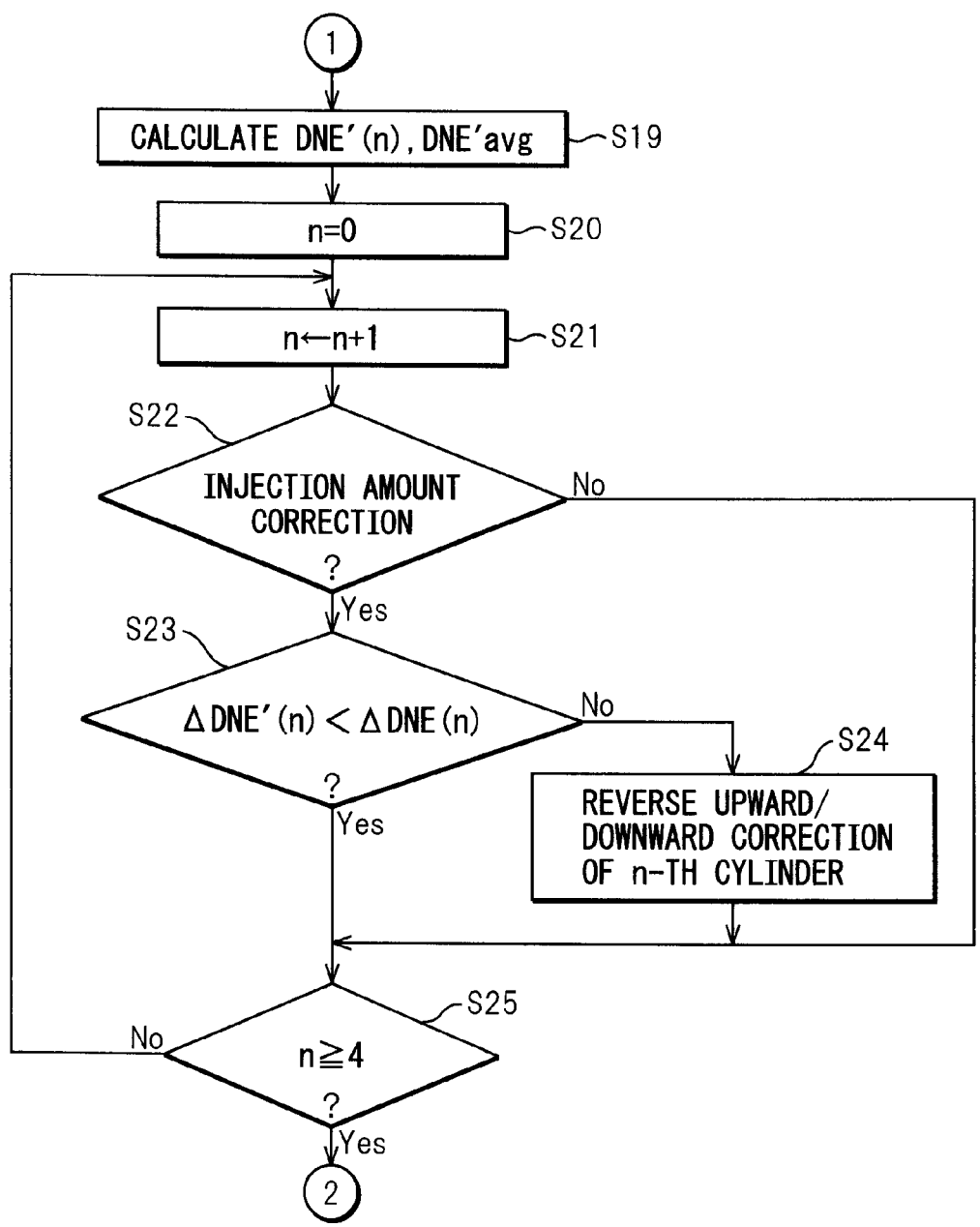
FIG. 9 is a portion of a flowchart showing a control routine of variation compensation control compensating for variation among cylinders of the ammonia injection amount.
Figure 10:
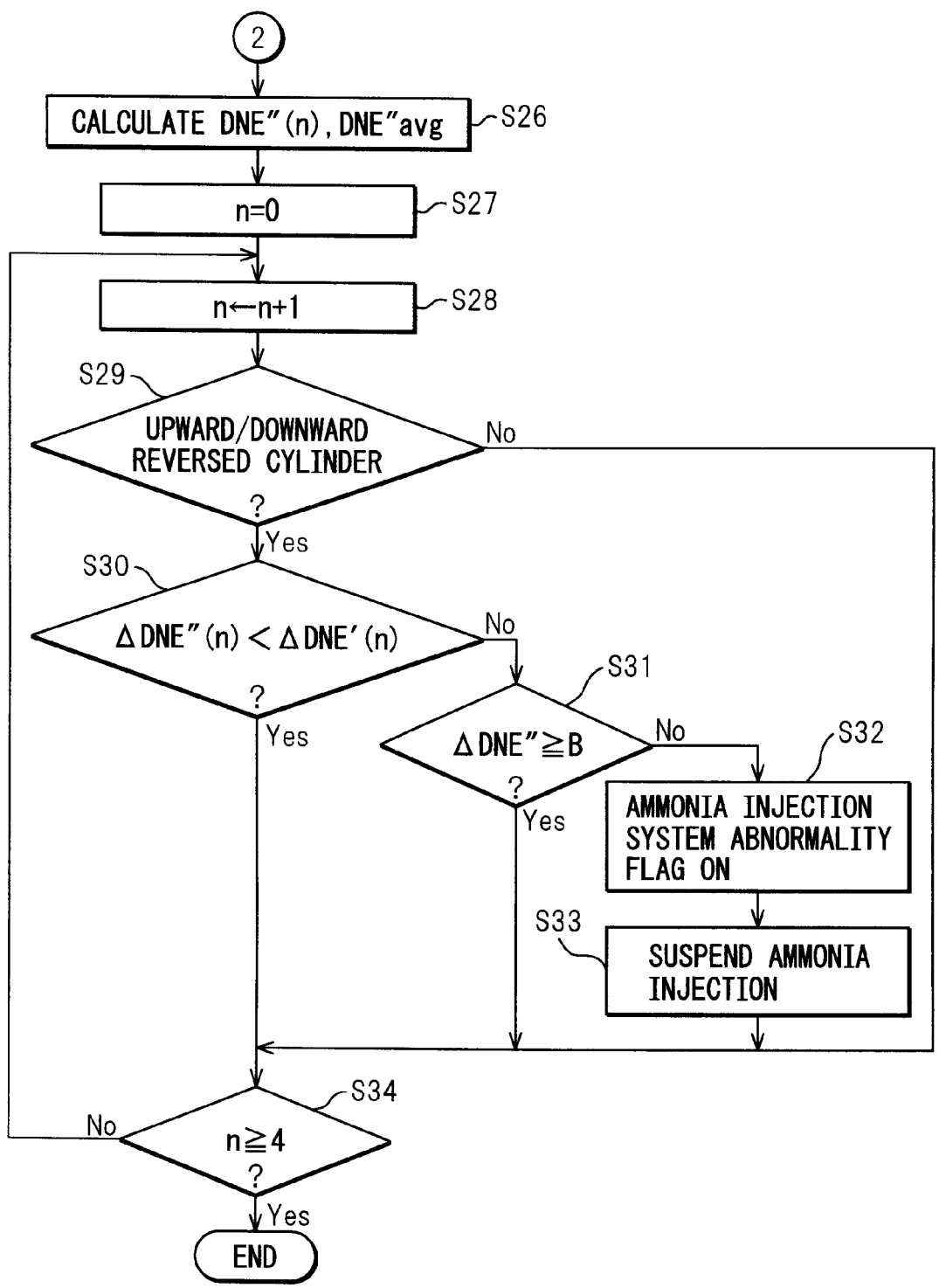
FIG. 10 is a portion of a flowchart showing a control routine of variation compensation control compensating for variation among cylinders of the ammonia injection amount.

FIG. 8 to FIG. 10 are flowcharts showing control routines of variation compensation control for compensating variation among cylinders of the ammonia injection amount from the ammonia injector 13.

Referring to FIG. 8 to FIG. 10, first, at step S11, a difference DNE (n) of peak speed between the two running modes for each cylinder and an average value DNEavg of differences of peak speeds in the two running modes are calculated. Then, at step S12, a cylinder counter n is reset to 0. At step S13, the cylinder counter n is incremented by 1. The cylinder counter n is a counter used for repeating a specific control routine by exactly the number of cylinders and is used, for example, for repeating steps S14 to S17 four times in a four-cylinder internal combustion engine.

At step S14, it is determined whether the difference DNE (n) of peak speed of the n-th cylinder is smaller than the average value DNEavg of differences of peak speeds. When it is determined that the difference DNE(n) of peak speed of the n-th cylinder is smaller than the average value DNEavg of differences of peak speeds, a lowering of torque due to abnormality of ammonia injection amount occurs for that cylinder, therefore the routine proceeds to step S15 in order to correct the ammonia injection amount. At step S15, it is determined whether an ammonia injection amount Qnh is the reference injection amount A or more. When it is determined at step S15 that the ammonia injection amount Qnh is the reference injection amount A or more, the routine proceeds to step S16. At step S16, the ammonia injection amount of the n-th cylinder is corrected downward. The degree of decrease of the ammonia injection amount may be constant or may be determined based on the difference of the difference DNE(n) of peak speed of the n-th cylinder from the average value DNEavg of differences of peak speeds. On the other hand, when it is determined at step S15 that the ammonia injection amount Qnh is smaller than the reference injection amount A, the routine proceeds to step S17. At step S1, the ammonia injection amount of the n-th cylinder is corrected upward.

On the other hand, when it is determined at step S14 that the difference DNE(n) of peak speed of the n-th cylinder is the average value DNEavg of differences of peak speeds or more, for that cylinder, lowering of torque due to abnormality of the ammonia injection amount does not occur, so steps S15 to S17 are skipped.

At step S18, it is determined whether the cylinder counter n is 4 or more, that is, whether the routine of steps S14 to S17 is carried out by exactly the number of cylinders. The routine proceeds to step S13 and the routine of steps S14 to S17 is repeated when the cylinder counter n is smaller than 4, while the routine proceeds to step S19 when the cylinder counter is 4 or more.

At step S19, in the same way as step S11, the difference DNE' (n) of peak speed between the two running modes for each cylinder and the average value DNE'avg of differences of peak speeds in the two running modes are calculated again. Then, at steps S20, S21, and S25, in the same way as steps S12, S13, and S18, the routine of steps S22 to S24 is repeated by exactly the number of cylinders.

At step S22, it is determined whether an upward correction or downward correction of the ammonia injection amount was carried out at step S16 or S17 for the n-th cylinder. When it is determined that the upward correction or downward correction was carried out for the n-th cylinder, the routine proceeds to step S23. At step S23, for the n-th cylinder, it is determined whether a difference ΔDNE'(n) (=DNE'(n)−DNE'avg) of the difference DNE'(n) of peak speed in the two running modes calculated at step S19 from the average value DNE'avg of differences of peak speeds in the two running modes is smaller than the difference ΔDNE(n) (=DNE(n)−DNEavg) of the difference DNE(n) of peak speed in the two running modes calculated at step S11 from the average value DNEavg of differences of peak speeds in the two running modes, that is, whether the peak speed of the n-th cylinder approaches the peak speeds of the other cylinders by the upward correction or downward correction.

When it is determined that ΔDNE'(n) is ΔDNE(n) or more, that is, when it is determined that the peak speed of the n-th cylinder does not approach the peak speeds of the other cylinders by the upward correction or downward correction, the routine proceeds to step S24 where the increase or decrease of correction of the ammonia injection amount of the n-th cylinder is reversed. On the other hand, when it is determined at step S23 that ΔDNE/(n) is smaller than DNE(n), that is, when it is determined that the peak speed of the n-th cylinder approaches peak speeds of the other cylinders by the upward correction or downward correction, step S24 is skipped.

On the other hand, when it is determined at step S22 that upward correction or downward correction is not carried out for the n-th cylinder, steps S23 and S24 are skipped.

After that, at step S26, in the same way as steps S11 and S19, a difference DNE"(n) of the peak speed in the two running modes for each cylinder and the average value DNE"avg of differences of peak speeds in the two running modes are calculated again. Then, at steps S27, S28, and S32, in the same way as steps S12, S13, and S18, steps S29 to S33 are repeated by exactly the number of cylinders.

At step S29, for the n-th cylinder, it is determined at step S24 whether the increase or decrease of the ammonia injection amount is reversed. When it is determined that the increase or decrease of ammonia injection amount is not reversed for the n-th cylinder, steps S30 to S33 are skipped. On the other hand, when it is determined at step S29 that the increase or decrease of the ammonia injection amount is reversed for the n-th cylinder, the routine proceeds to step S30. At step S30, for the n-th cylinder, it is determined whether the difference ΔDNE"(n) (=DNE" (n)−DNE"avg) of the difference DNE"(n) of the peak speed in the two running modes which is calculated at step S26 from the average value DNE"avg of differences of peak speeds in the two running modes is smaller than DNE'(n) described above, that is, whether the peak speed of the n-th cylinder approaches the peak speeds of the other cylinders by reversal of increase or decrease of ammonia injection amount.

When it is determined that ΔDNE"(n) is smaller than ΔDNE'(n), that is, when it is determined that the peak speed of the n-th cylinder approaches peak speeds of the other cylinders by reversal of increase or decrease of the ammonia injection amount, steps S31 to S33 are skipped. On the other hand, when it is determined that $\Delta DNE''(n)$ is $\Delta DNE'(n)$ or more, that is, when it is determined that the peak speed of the n-th cylinder does not approach the peak speeds of the other cylinders by reversal of increase or decrease of the ammonia injection amount, the routine proceeds to step S31.

At step S31, it is determined whether $\Delta DNE''(n)$ is smaller than a value B determined in advance, that is, whether the peak speed is extremely different from the other cylinders in only the n-th cylinder. When it is determined that $\Delta DNE''(n)$ is smaller than the value B determined in advance, that is, when it is determined that the peak speed is not extremely different in the n-th cylinder from the other cylinders, steps S32 and S33 are skipped.

On the other hand, when it is determined at step S31 that $\Delta DNE''(n)$ is the value B determined in advance or more, that is, when it is determined that the peak speed is extremely different in only the n-th cylinder from the other cylinders, at step S32, it is determined that an abnormality has occurred in the ammonia injection system, an abnormality flag is set, and injection of ammonia from the ammonia injector 13 is suspended at step S33.

While the invention has been described with reference to specific embodiments chosen for purpose of illustration, it should be apparent that numerous modifications could be made thereto by those skilled in the art without departing from the basic concept and scope of the invention.

What is claimed is:

1. A control system of an internal combustion engine which is provided with an ammonia feeding system feeding ammonia and a non-ammonia fuel feeding system feeding non-ammonia fuel which is easier to burn than ammonia and which can run in a first running mode feeding only the non-ammonia fuel into a combustion chamber and a second running mode feeding both ammonia and non-ammonia fuel into the combustion chamber, which detects engine speeds or generated torques at the time of running in the first running mode and the time of running in the second running mode, calculates a difference among cylinders of engine speed or generated torque which may occur when feeding only ammonia into the combustion chamber based on the difference of engine speed or generated torque detected between the two running modes, and corrects an ammonia feed amount from the ammonia feeding system of each cylinder based on the calculated difference among cylinders of engine speed or generated torque.

2. A control system of an internal combustion engine as set forth in claim 1, wherein when the ammonia feed amount is a reference feed amount or more, the system corrects downward an ammonia feed amount of a cylinder in which the engine speed or generated torque which may occur when feeding only ammonia into a combustion chamber is smaller than in the other cylinders and, when the ammonia feed amount is smaller than the reference feed amount, the system corrects upward an ammonia feed amount of a cylinder in which the engine speed or generated torque which may occur when feeding only ammonia into a combustion chamber is smaller than in the other cylinders.

3. A control system of an internal combustion engine as set forth in claim 2, wherein when downward correction of the ammonia feed amount does not result in the difference of engine speed or generated torque which may occur when feeding only ammonia into a combustion chamber between the downward corrected cylinder and other cylinders becoming smaller, the system corrects upward the ammonia feed amount and when upward correction of the ammonia feed amount does not result in the difference of engine speed or generated torque which may occur when feeding only ammonia into a combustion chamber between the upward corrected cylinder and the other cylinders becoming small, the system corrects downward the ammonia feed amount.

4. A control system of an internal combustion engine as set forth in claim 3, wherein the system stops the feed of ammonia when the difference of engine speed or generated torque which may occur when feeding only ammonia into a combustion chamber between the upward or downward corrected cylinder and the other cylinders does not become small even when correcting the ammonia feed amount upward or correcting it downward.

* * * * *